UNITED STATES PATENT OFFICE.

CHRISTOPH RIS, OF BASLE, SWITZERLAND, ASSIGNOR TO JOHN R. GEIGY & CO., OF SAME PLACE.

YELLOW DYE.

SPECIFICATION forming part of Letters Patent No. 440,281, dated November 11, 1890.

Application filed February 13, 1890. Serial No. 340,350. (No specimens.)

*To all whom it may concern:*

Be it known that I, CHRISTOPH RIS, of Basle, Switzerland, have invented a certain new and useful Process for the Production of Yellow Coloring-Matter, of which the following is a specification.

The diazo-compound of polychromine (sulpho-acid of thioparatoluidine, also called "primuline") is but slowly decomposed when boiled in an acidulated solution, and the resulting product is of no practical value; but it undergoes a quick change when submitted to the action of alkalies. When a watery solution is mixed with ammonia and left to stand, it acquires a brown color, while nitrogen is formed. By boiling the reaction is completed and the new dye-stuff finished. It dyes cotton without the aid of a mordant.

As an example of the manner of carrying out the invention, fifty kilos of polychromine dissolved in one thousand liters of water and mixed with thirty kilos of muriatic acid, 20.5° Baumé, are diazotized by addition of seven kilos of nitrite of sodium. Then thirty kilos of ammonia, 25° Baumé, are added. About twelve hours later the solution is boiled, and when no more scum is to be observed the coloring-matter is precipitated by the addition of salt. When dried, it forms a light-brown powder, easily soluble in water, with a yellow color, and dyeing unmordanted cotton gold-yellow. This new substance is scarcely soluble in spirit, a little better in methyl alcohol, scarcely in acetic acid, and insoluble in benzine and ether. Concentrated sulphuric acid dissolves it with brown-yellow color. By caustic alkalies it obtains an intensive orange-red color.

The new coloring-matter can be diazotated, and requires for this purpose nearly half of the nitrite necessary to make from polychromine its diazo-compound.

Contrary to the action of ammonia upon the diazo-compound of polychromine, caustic alkalies or their carbonates yield coloring-matters of little value, dyeing cotton not with a bright-yellow color. They are more gray or brown and have less dyeing power. Substances obtained in this way can no more be diazotated.

I claim—

The yellow coloring-matter obtained by treating the diazo compound of polychromine with ammonia, which forms a light-brown colored powder easily soluble in water, badly soluble in common spirit, a little better in methyl alcohol, scarcely soluble in concentrated acetic acid, and insoluble in benzol and ether.

In testimony whereof I hereunto sign my name, in the presence of two subscribing witnesses, this 31st day of January, 1890.

CHRISTOPH RIS.

Witnesses:
GEORGE GIFFORD,
CHS. A. RICHTER.